US00RE44997E

(19) United States
(12) Reissued Patent
Kanzaki

(10) Patent Number: US RE44,997 E
(45) Date of Reissued Patent: Jul. 8, 2014

(54) PHOTOGRAPHING APPARATUS

(71) Applicant: Pentax Ricoh Imaging Imaging Company, Ltd, Tokyo (JP)

(72) Inventor: Tomohiko Kanzaki, Tokyo (JP)

(73) Assignee: Pentax Ricoh Imaging Company, Ltd., Tokoyo (JP)

(21) Appl. No.: 13/729,380

(22) Filed: Dec. 28, 2012

Related U.S. Patent Documents

Reissue of:
(64) Patent No.: 7,864,220
Issued: Jan. 4, 2011
Appl. No.: 11/853,918
Filed: Sep. 12, 2007

(30) Foreign Application Priority Data

Sep. 13, 2008 (JP) ..... 2006-247497

(51) Int. Cl.
*H04N 5/228* (2006.01)
*H04N 5/225* (2006.01)

(52) U.S. Cl.
USPC ..... 348/222.1; 348/376

(58) Field of Classification Search
None
See application file for complete search history.

(56) References Cited

U.S. PATENT DOCUMENTS

| | | | | |
|---|---|---|---|---|
| 5,625,848 | A * | 4/1997 | Imanari | 396/50 |
| 2002/0008765 | A1 | 1/2002 | Ejima et al. | |
| 2004/0090539 | A1* | 5/2004 | Kim et al. | 348/231.1 |
| 2004/0169769 | A1 | 9/2004 | Tatamiya | |
| 2004/0218065 | A1* | 11/2004 | Schinner | 348/231.6 |
| 2005/0012829 | A1* | 1/2005 | Tashiro et al. | 348/231.99 |
| 2005/0013602 | A1 | 1/2005 | Ogawa | |
| 2005/0195293 | A1 | 9/2005 | Kobayashi et al. | |
| 2005/0231611 | A1 | 10/2005 | Anderson et al. | |
| 2006/0221223 | A1* | 10/2006 | Terada | 348/333.05 |
| 2006/0256211 | A1* | 11/2006 | Handa | 348/231.7 |
| 2006/0268127 | A1 | 11/2006 | Sato et al. | |
| 2007/0139533 | A1* | 6/2007 | Ohashi | 348/231.99 |
| 2008/0024632 | A1* | 1/2008 | Otsuka | 348/294 |

FOREIGN PATENT DOCUMENTS

| | | |
|---|---|---|
| EP | 1727025 | 11/2006 |
| JP | 1-217435 | 8/1989 |
| JP | 2005-094298 | 4/2005 |
| JP | 2005-221771 | 8/2005 |

(Continued)

OTHER PUBLICATIONS

Notification of Reasons for Refusal for JP Application No. 2006-247497 dated May 24, 2011.

(Continued)

*Primary Examiner* — Sinh Tran
*Assistant Examiner* — Jason Flohre
(74) *Attorney, Agent, or Firm* — Frommer Lawrence & Haug LLP

(57) ABSTRACT

A photographing apparatus comprises an operation unit and a controller. The operation unit has a direct key and an operation key. The operation key is used for setting a function regarding at least one of an image processing operation of an image data obtained by a photographing operation and a storing operation of the image data and is operated more than once for setting the function. The direct key is used for setting the function and is operated only once for setting the function. The controller sets the function corresponding to an operation of the operation key and that sets the function corresponding to one operation of the direct key. When the direct key is operated once, the function is set regardless of a prior function state set by operating the operation key.

12 Claims, 8 Drawing Sheets

(56) References Cited

FOREIGN PATENT DOCUMENTS

| | | |
|---|---|---|
| JP | 2005-223616 | 8/2005 |
| JP | 2005-267000 | 9/2005 |
| JP | 2006-186607 | 7/2006 |

OTHER PUBLICATIONS

Notification of Reasons for Refusal for JP Application No. 2006-247497 dated Mar. 8, 2011.
U.S. Office Action for U.S. Appl. No. 11/853,918 dated Dec. 29, 2009.
U.S. Final Office Action for U.S. Appl. No. 11/853,918 dated Jul. 9, 2010.
English Language Abstract of JP 2006-186607.
U.S. Appl. No. 11/853,863 to Hikari et al., which was filed Sep. 12, 2007.
U.S. Appl. No. 11/853,902 to Okamoto et al., which was filed Sep. 12, 2007.
U.S. Appl. No. 11/853,935 to Fujio et al., which was filed Sep. 12, 2007.
U.S. Appl. No. 11/853,984 to Hamamura et al., which was filed Sep. 12, 2007.

* cited by examiner

PHOTOGRAPHING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a photographing apparatus, and in particular to an apparatus whose function can be easily set.

2. Description of the Related Art

A photographing apparatus, whose function regarding an image processing operation of an image data obtained by a photographing operation and the storing operation of the image data is set by using a menu key etc., such as Japanese unexamined patent publication (KOKAI) No. 2006-186607, is proposed.

However, because in this case it is necessary to operate the menu key etc. more than once to set the function, the operation becomes complicated.

SUMMARY OF THE INVENTION

Therefore, an object of the present invention is to provide a photographing apparatus whose function regarding an image processing operation of an image data obtained by a photographing operation and the storing operation of the image data, can be set without a complicated operation.

According to the present invention, a photographing apparatus comprises an operation unit and a controller. The operation unit has a direct key and an operation key. The operation key is used for setting a Inaction regarding at least one of an image processing operation of an image data obtained by a photographing operation and a storing operation of the image data and is operated more than once for setting the function. The direct key is used for setting the function and is operated only once for setting the function. The controller sets the function corresponding to an operation of the operation key and that sets the function corresponding to one operation of the direct key. When the direct key is operated once, the function is set regardless of a prior function state set by operating the operation key.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
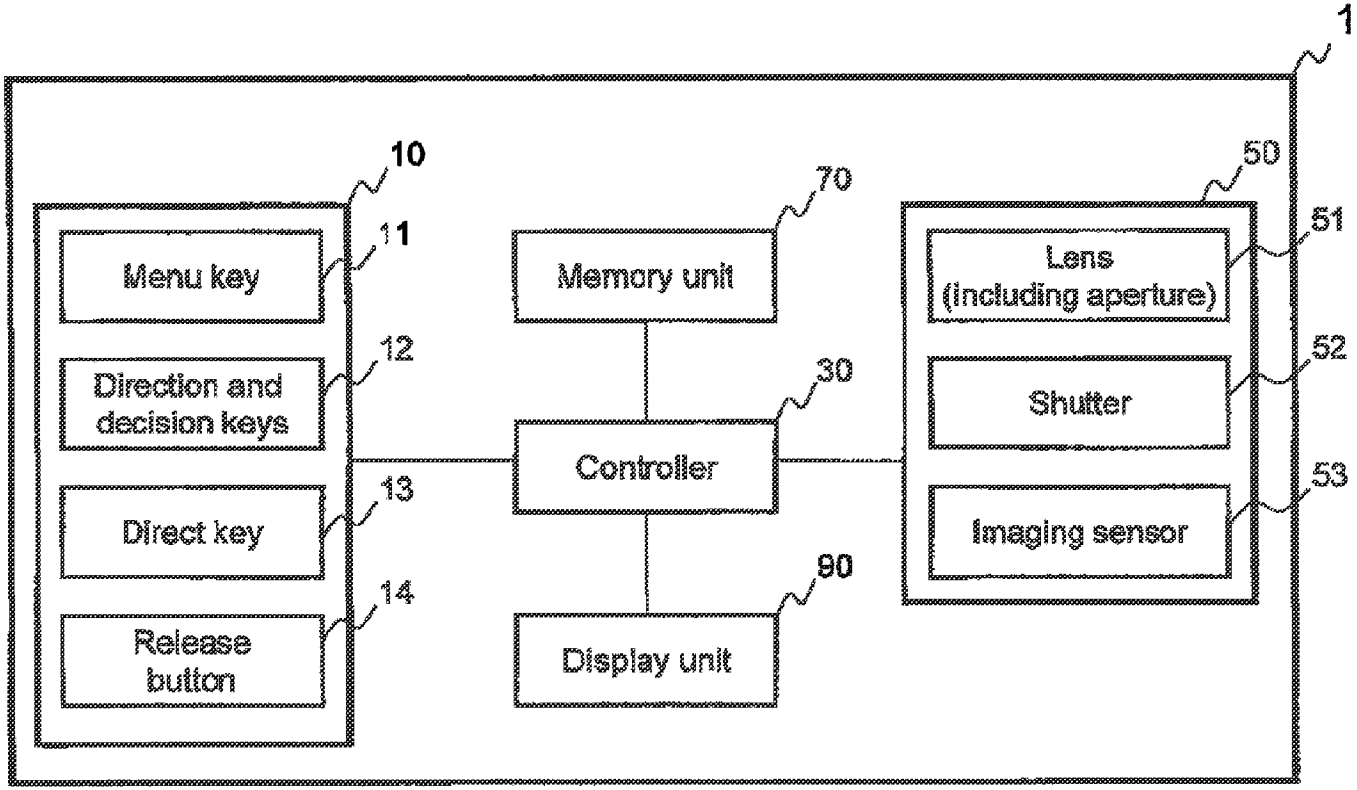
FIG. 1 is a block diagram of the photographing apparatus of the embodiment.

The present invention is described below with reference to the embodiment shown in the drawings. In this embodiment, the photographing apparatus 1 is a digital camera.

The imaging part of the photographing apparatus 1 comprises an operation unit 10, a controller 30, a photographing unit 50, a memory unit 70, and a display unit 90 (see FIG. 1).

Figure 2:
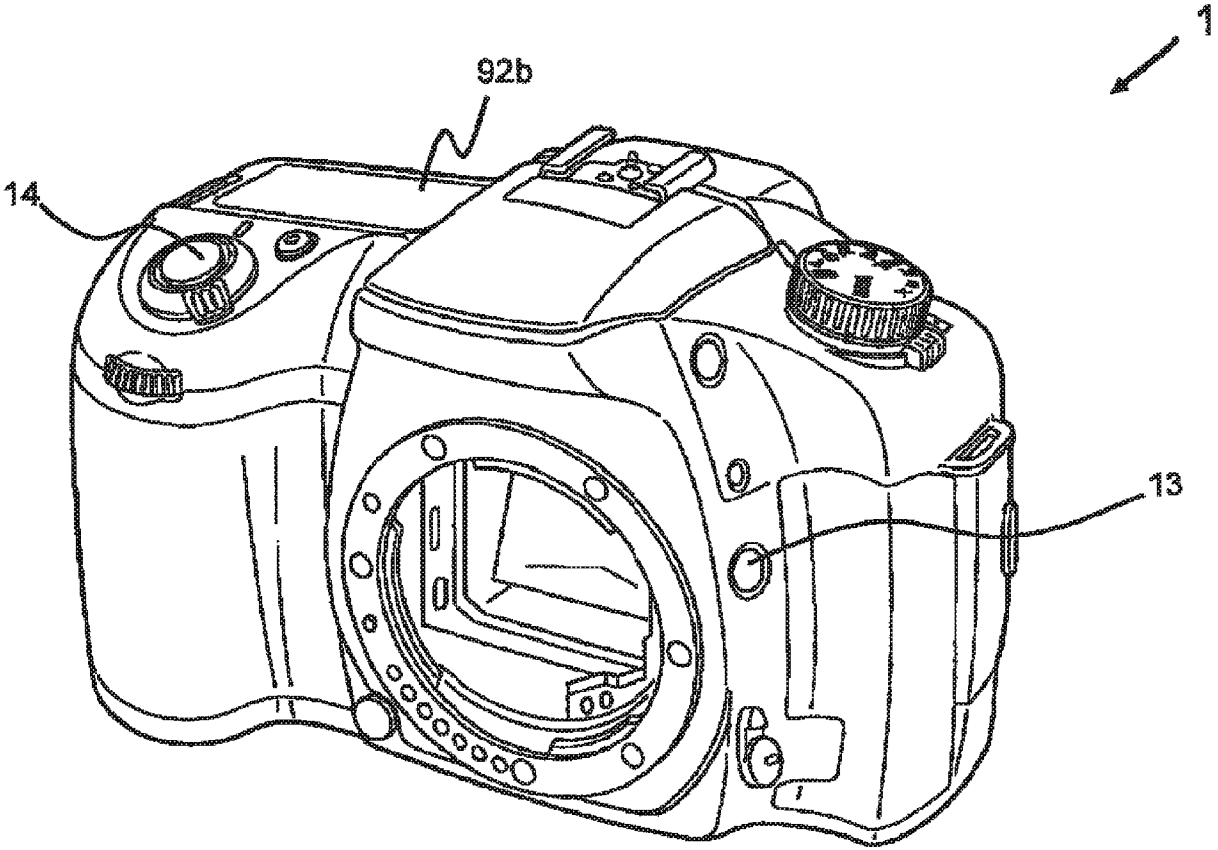
FIG. 2 is a perspective front view of the photographing apparatus.
Figure 3:
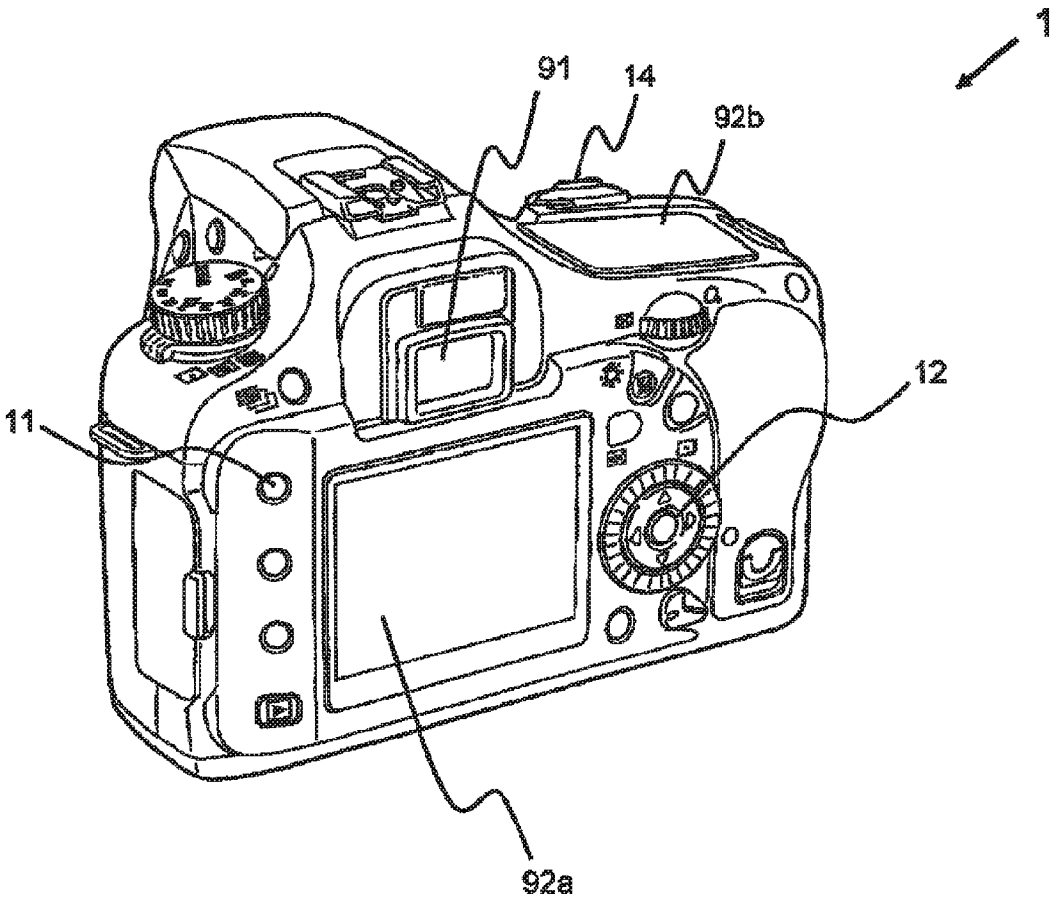
FIG. 3 is a perspective rear view of the photographing apparatus.

The operation unit 10 has a menu key 11, direction and decision keys 12, a direct key 13, and a release button 14 (see FIGS. 1 to 3).

The photographing unit 50 has a lens 51 including an aperture, a shutter, 52, and an imaging sensor 53 such as a CCD etc.

The display unit 90 has an optical finder 91, a first display 92a, and a second display 92b.

In a photographing operation, the photographic subject image is captured as an optical image through the lens 51 and the shutter 52 by the imaging sensor 53 so that the image obtained by the photographing operation is displayed on the first display 92a and the image data obtained by the photographing operation is stored in the memory unit 70.

The exposure condition of the photographing operation, that includes a shutter speed, an aperture value, and a sensitivity (a photographic speed) of the imaging sensor 53, is determined by at least one of a manual setting operation of the operation unit 10 by the user, and an AE calculation by the controller 30 based on a setting condition by the user and an information regarding a photometric operation from an AE sensor (not depicted).

Corresponding to the operation of the menu key 11 and the direction and decision keys 12 as the operation keys, by the operator, a function regarding an image processing operation and a storing operation of the image data obtained by the photographing operation is set.

Specifically, the file format of the image data such as JPEG, TIFF, and RAW, the number of recorded pixels (JPEG Recorded Pixels), the compression ratio for storing the image data to the memory unit 70 (a JPEG Quality Level), the sensitivity of the imaging sensor 53, the sharpness, and the contrast etc., are set by the user.

When a function is set based on the operation of the menu key 11 and the direction and decision keys 12, it is necessary to operate these keys more than once.

When the direct key 13 is depressed once, the file format is selected as the RAW+ mode, so that the image data is stored in both the RAW and JPEG formats. The release method of the RAW+ mode has a first pattern and a second pattern.

In the first pattern, the RAW+ mode is released so that the file format is returned to the previous file format after the photographing operation is performed once.

In the second pattern, the RAW+ mode is released so that the file format is returned to the previous file format after the direct key 13 is depressed again.

A selection of whether the release method of the RAW+ mode, set by depressing the direct key 13, is set to the first pattern or the second pattern, is performed by operating the menu key 11 and the direction and decision keys 12.

The direct key 13 is arranged on the front of the photographing apparatus 1, on the right-hand side surface of the lens-mounting section, which is used for installing the lens 51, when viewed from the front, so that the direct key 13 can be depressed using the left thumb etc. while holding the photographing apparatus 1.

When the direct key 13 is depressed once, the function is set so that the image data is stored in both the RAW and JPEG formats, regardless of prior function state which was set by operating the menu key 11 and the direction and decision keys 12.

In other words, when the direct key 13 is depressed once, the file format is selected as the RAW+ mode, whereby the image data is stored in both the RAW and JPEG formats, regardless of the previous file format which was set by operating the menu key 11 and the direction and decision keys 12 before the direct key 13 was depressed.

In the embodiment, in the RAW+ mode, the image data is stored in both the RAW and JPEG formats, however, the image data may be stored in both the RAW format and another format.

In the first pattern, the state of the photographing apparatus 1 after the function is set (i.e. after the file format is set) by the direct key 13, in other words, the RAW+ mode; is released so that the state of the photographing apparatus 1 (the file format) is returned to the prior state (the previous file format) that was set before depressing the direct key 13; when the direct key 13 is depressed again before the photographing operation is next performed by fully depressing the release button 14; when the photographing operation is performed by fully depressing the release button 14 once; or when the electrical power of the photographing apparatus 1 is set to the OFF state and then the electrical power of the photographing apparatus 1 is set to the ON state again.

In the second pattern, the state of the photographing apparatus 1 after the function is set (i.e. after the file format is set) by the direct key 13, in other words, the RAW+ mode; is released so that the state of the photographing apparatus 1 (the file format) is returned to the prior state (the previous file format) that was set before depressing the direct key 13; when the direct key 13 is depressed again; or when the electrical power of the photographing apparatus 1 is set to the OFF state and then the electrical power of the photographing apparatus 1 is set to the ON state again.

Therefore, the operation to change to the predetermined file format can be simply and quickly performed only by depressing the direct key 13, compared to when the operation to change to the predetermined file format is performed by using the menu key 11 and the direction and decision keys 12.

In the case that the RAW file format is used for storing the image data, the pixel signals from the imaging sensor 53 are stored without compression, so the file size using the RAW file format is larger than the file size using the JPEG compressed file format. If the user were to forget the release of the predetermined file format (the RAW+ mode), that would return the format to the state previous to the change operation, the storage capacity of the memory unit 70 would be needlessly consumed. However, in the embodiment, when the release method is set to the first pattern, the file format is automatically returned to the previous file format by the photographing operation. Therefore, this problem does not occur.

The photographic subject image can be optically observed through the lens 51 with the optical finder 91.

When the release button 14 is partially depressed by the user, the photometric switch (not depicted) changes to the ON state so that the photometric operation by the AE sensor (not depicted), the AF sensing operation and the focusing operation by the AF sensor (not depicted) are performed.

When the release button 14 is fully depressed by the user, the release switch (not depicted) changes to the ON state so that the photographing operation is performed, and the image, which is captured, is displayed in the first display 92a, and the image data is stored in the memory unit 70.

The controller 30 is a control apparatus which controls each part of the photographing apparatus 1 regarding the photographing operation; in particular, the controller 30 sets the function regarding the image processing operation on the image data obtained by the photographing operation, and the storing operation, corresponding to the operation of the operation unit 10.

The controller 30 stores the contents of the function utilized by depressing the direct key 13, such that the file format is set to both the RAW and JPEG formats, to a memory such as a ROM that is connected to (or installed in) the controller 30.

The optical finder 91 is a finder that is used for observing the optical image of the photographing subject through the lens 51 and for observing the exposure condition as set by the user or calculated by the photometric operation, with one of the user's eyes.

Figure 5:
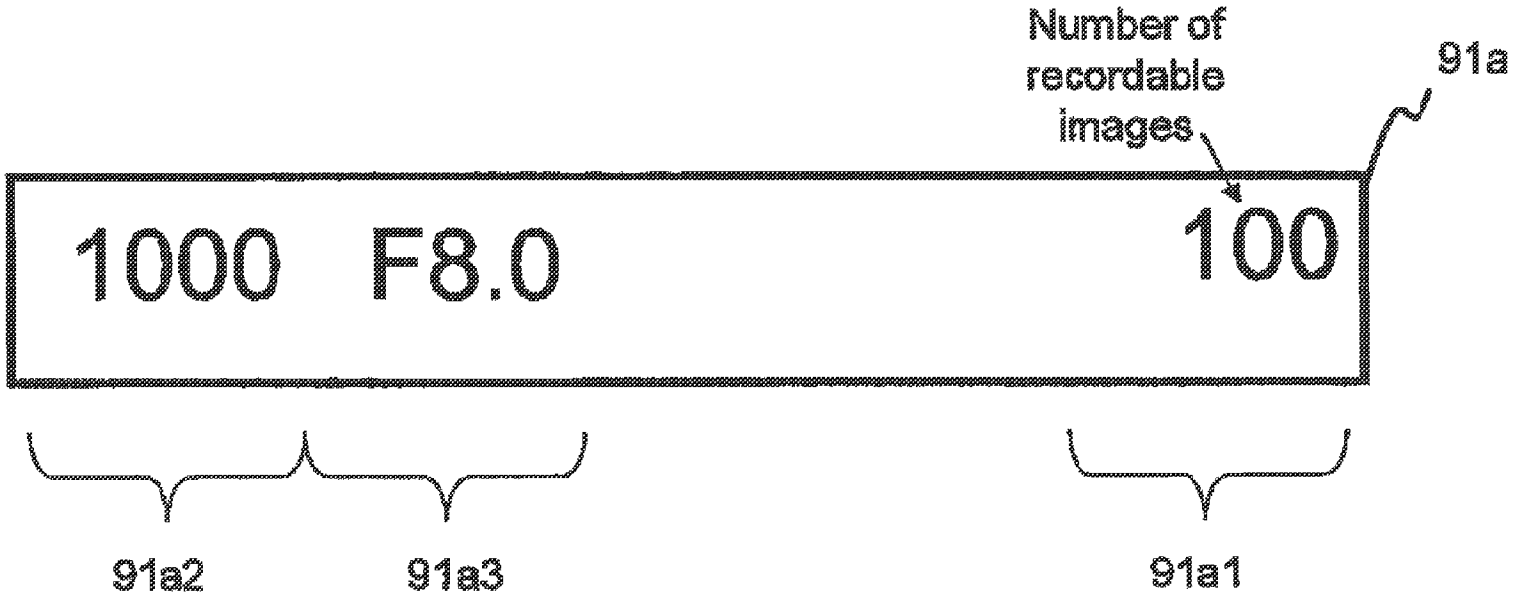
FIG. 5 shows display content that is displayed in the exposure condition display area of the optical finder before the direct key is depressed.
Figure 7:
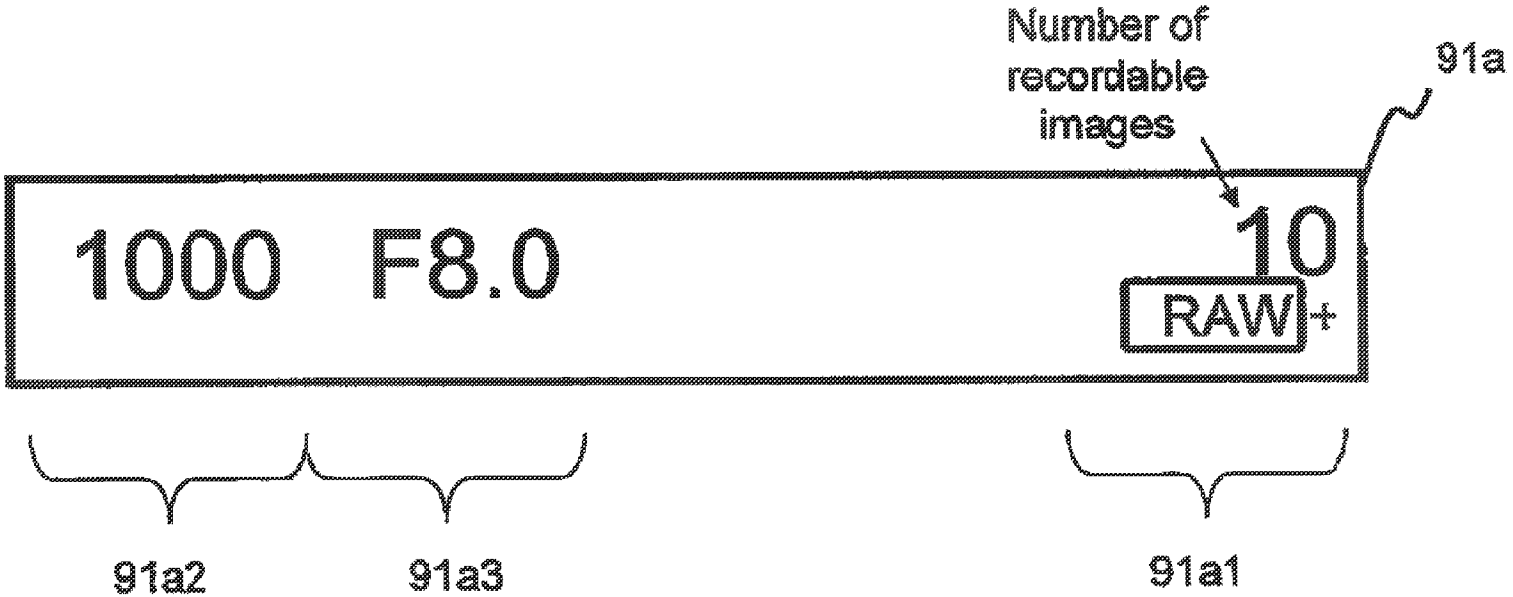
FIG. 7 shows display content that is displayed in the exposure condition display area of the optical finder after the direct key is depressed.

The optical finder 91 has an area that displays the optical image (not depicted) and an exposure condition display area 91a that displays the exposure condition, such as the shutter speed, etc., (see FIGS. 5 and 7).

The exposure condition display area 91a has a first number display area 91a1 that displays the number of recordable images, a first shutter-speed display area 91a2 that displays the shutter speed, and a first aperture-value display area 91a3 that displays the aperture value.

The first display 92a is an indicating apparatus that is arranged on the rear surface of the photographing apparatus 1 and displays the image obtained by the photographing operation and the information regarding setting function, such as the file format, etc.

The user can set the function of the photographing apparatus 1 by operating the menu key 11 and the direction and decision keys 12, by viewing the information on the first display 92a.

The second display 92b is an indicating apparatus that is arranged on the top surface of the photographing apparatus 1 and displays the information about the function that is set, regarding the exposure condition, the image processing operation, such as the white balance, etc., and the storing operation.

Figure 4:
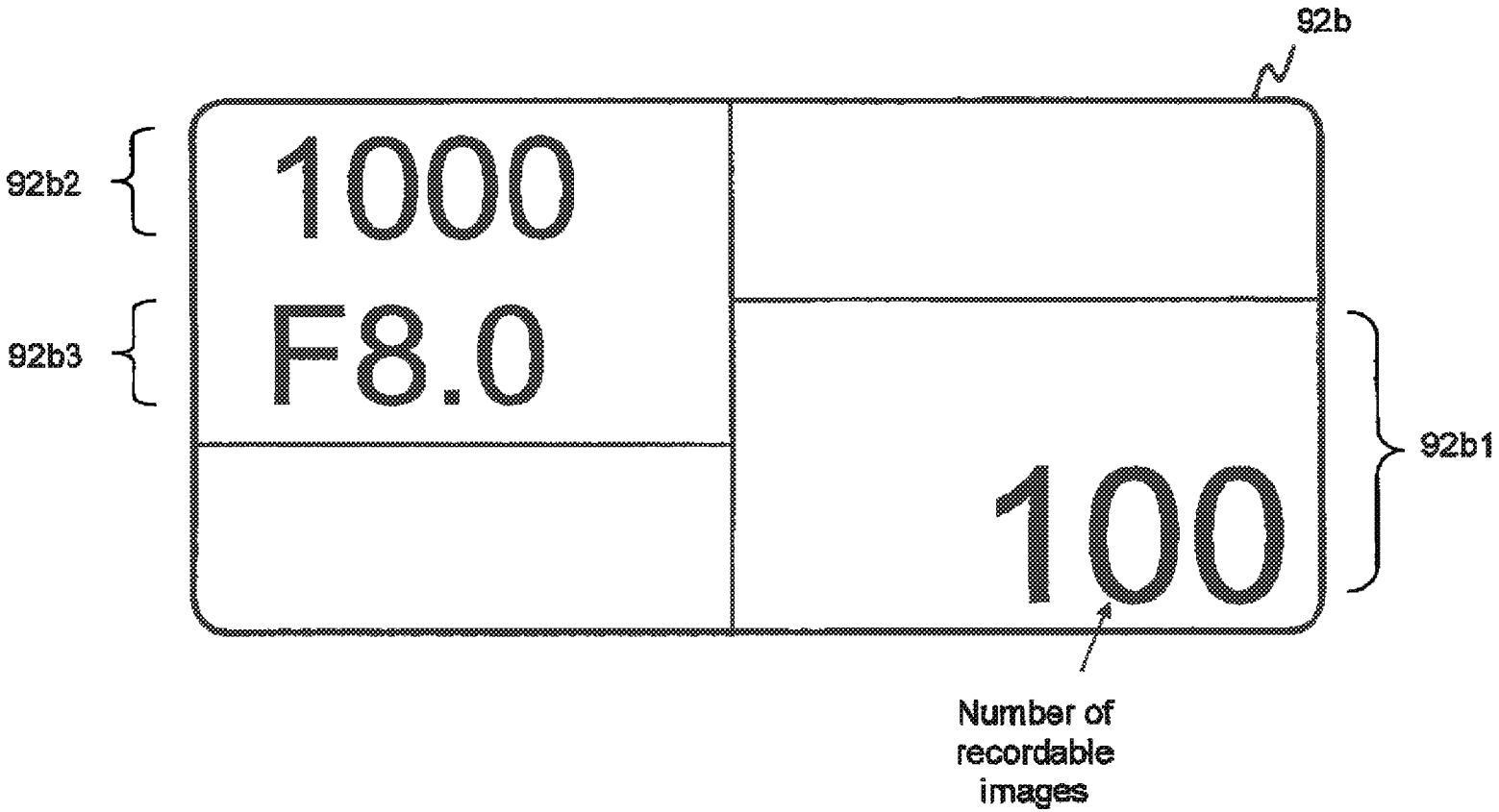
FIG. 4 shows display content that is displayed in the second display before the direct key is depressed.
Figure 6:
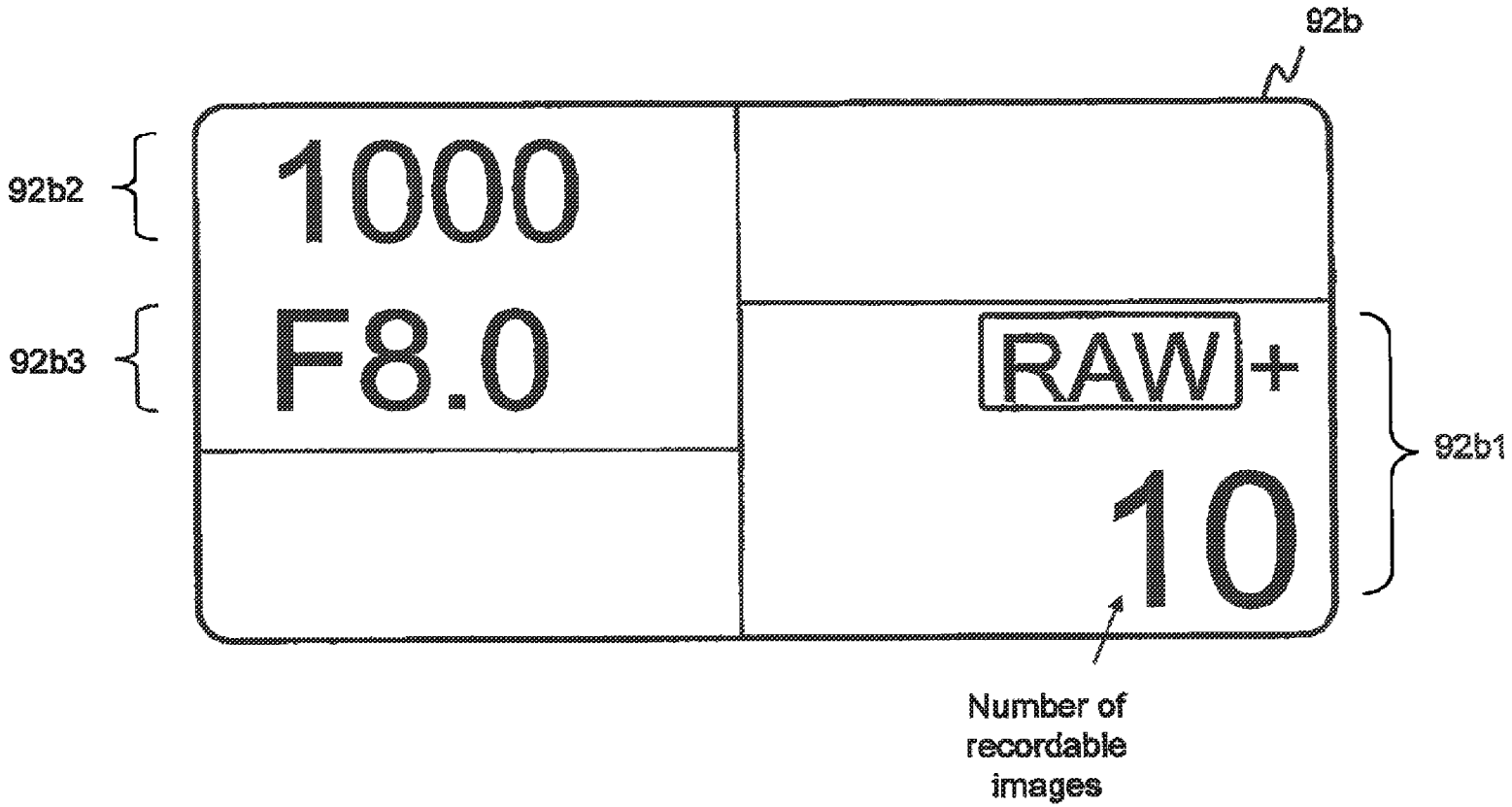
FIG. 6 shows display content that is displayed in the second display after the direct key is depressed.

The second display 92b has a second number display area 92b1 that displays the remaining number of recordable images, a second shutter-speed display area 92b2 that displays the shutter speed, and a second aperture-value display area 92b3 that displays the aperture value (see FIGS. 4 and 6).

When the file format is set to the RAW+ mode, such that the image data is stored in both the RAW and JPEG formats when depressing the direct key 13 etc., the number of recordable images based on the vacant capacity of the memory unit 70 and an "RAW+" mark that displays that the file format is set to both the RAW and JPEG formats, are displayed in the first number display area 91a1 and the second number display area 92b1 (see FIGS. 6 and 7). The letters "RAW" of the RAW+ mark are surrounded by a black rectangle frame on a white background.

When the file format is set to RAW mode, so that the image data is stored in the RAW format, the number of recordable images based on the vacant capacity of the memory unit 70, and an "RAW" mark that displays that the file format is set to RAW format, are displayed in the first number display area 91a1 and the second number display area 92b1 (not depicted). The RAW mark is surrounded by a black rectangle frame on a white background.

When the file format is set to JPEG mode so that the image data is stored in the JPEG format, or TIFF mode so that the image data is stored in the TIFF format, the number of recordable images based on the vacant capacity of the memory unit 70 is displayed in the first number display area 91a1 and the second number display area 92b1 (see FIGS. 4 and 5).

Therefore, because the state after depressing the direct key 13 is displayed in the first number display area 91a1 and the second number display area 92b1, the file format and the number of recordable images can be visually recognized in the case that the file format, including the RAW format, is selected. In the case that the RAW format is selected as the file format, the necessity to confirm the number of recordable images becomes high compared to the case that a compressed file format such as the JPEG format is selected as the file format.

Figure 8:
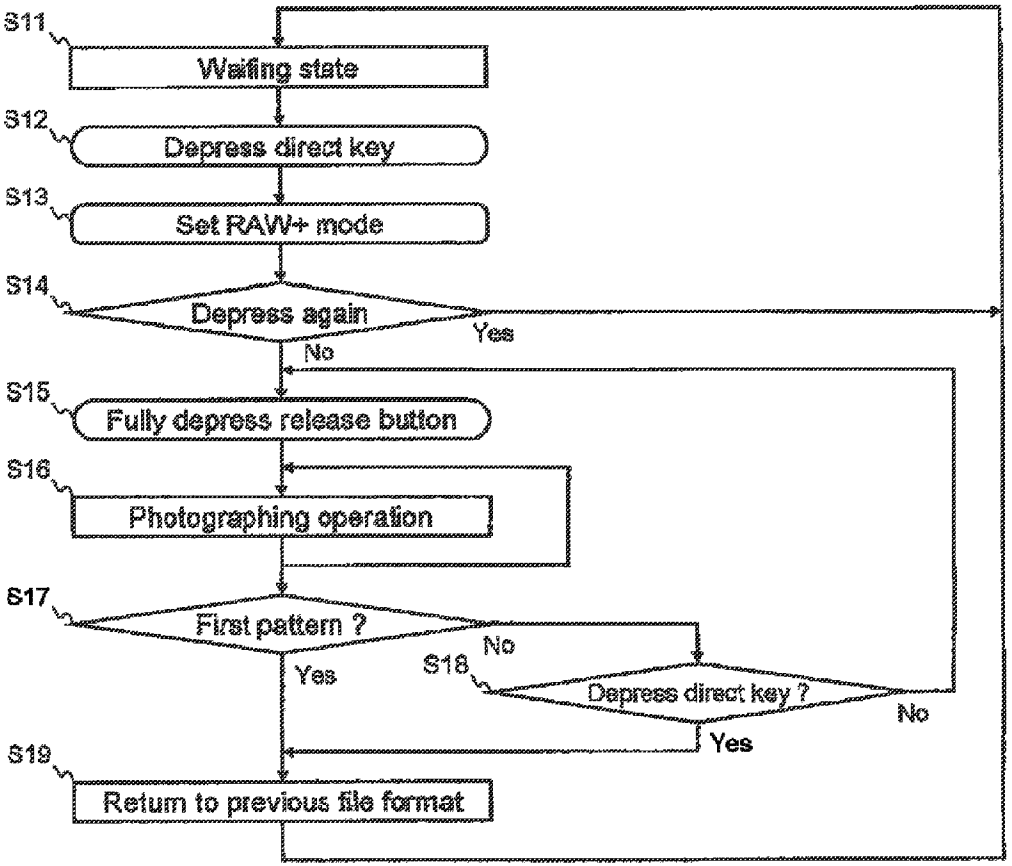
FIG. 8 is a flowchart that shows the process when the direct key is depressed and then the file format is changed.

Next, the flow of the process when the direct key 13 is depressed and the file format is changed is explained by using the flowchart in FIG. 8.

The operation commences with a waiting state of the photographing operation in step S11. After the electric power of the photographing apparatus 1 is set to the ON state, the photographing apparatus 1 is in a state called the waiting state, whereby the photographing operation can be performed. Before the operation in step S12, the file format is set (or selected) from at least one of the file formats such as the JPEG format etc., in advance. The operation ends whenever the photographing apparatus 1 is set to the OFF state.

In step S12, the direct key 13 is depressed. In step S13, the function is set to the image data being stored in both the RAW and JPEG formats, regardless of the prior function state which was set by operating the menu key 11 and the direction and decision keys 12.

In other words, when the direct key 13 is depressed once, the file format is selected as the RAW+ mode, so that the image data is stored in both the RAW and JPEG formats, regardless of the previous file format which was set by operating the menu key 11 and the direction and decision keys 12 before the direct key 13 was depressed.

In step S14, it is determined whether the direct key 13 has been depressed again. If it is determined that the direct key 13 has been depressed again, the file format is returned to the previous file format that was set before depressing the direct key 13 in step S12 and then the operation returns to step S11. Otherwise, the operation continues to step S15.

In step S15, the release button 14 is fully depressed. In step S16, the photographing operation is performed, and the image on which the image processing operation was performed is displayed in the first display 92a and the image data is stored in the RAW file format and in the JPEG file format into the memory unit 70.

In the case that the photographing apparatus 1 is in the continuous shooting mode, the photographing operation in step S16 is repeatedly performed while the release button 14 is fully depressed (held down).

In step S17, it is determined whether the release method of the RAW+ mode that was set by depressing the direct key 13 is set to the first pattern, or not. If it is determined that the release method of the RAW+ mode that was set by depressing the direct key 13 is set to the first pattern, the operation proceeds directly to step S19. Otherwise, the operation continues to step S18.

In step S18, it is determined whether the direct key 13 is depressed. If it is determined that the direct key 13 is depressed, the operation continues to step S19. Otherwise, the operation returns to step S15.

In step S19, the file format is returned to the previous file format that was set before depressing the direct key 13 in step S12.

It may be desirable that the image data of a format on which a photo retouch operation can be optionally performed after the photographing operation, i.e. the RAW file format, and the image data of another file format that can immediately be displayed after the photographing operation, such as the JPEG file format, are stored. This could be desirable in the case that the photographing condition is suddenly changed, or the user's intended framed subject is suddenly changed. Accordingly, in the embodiment, the function is set so that the image data is stored in both the RAW and JPEG formats by depressing the direct key 13.

However, by depressing the direct key 13, the function may be set so that the image data is stored in another file format, such as only in the RAW file format.

Further, by depressing the direct key 13, another function may be set. For example, by depressing the direct key 13, the function may set so that the image data is stored in a predetermined file format and in predetermined recorded pixels, for example, with the specifications for a mobile phone to which the image data is to be transmitted by email. Or, by depressing the direct key 13, the function may be set so that an indication on the first display 92a for the adjustment of the white balance is displayed.

Further, in the embodiment, the content of the function that is set by depressing the direct key 13 is fixed and is stored in memory such as the ROM in advance. However, the content of the function that is set by depressing the direct key 13 may be changeable by operating the menu key 11 and the direction and decision keys 12 etc.

In this case, the content of the function that is set by depressing the direct key 13 is stored in memory such as a RAM etc that is connected to or included in the controller 30. When the content of the function that is set by depressing the direct key 13 is changed, the content is rewritten.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-247497 (filed on Sep. 13, 2006), which is expressly incorporated herein by reference, in its entirety.

The invention claimed is:

[1. A photographing apparatus comprising:

an operation unit that has a direct key and an operation key, said operation key being used for setting a function regarding at least one of an image processing operation of an image data obtained by a photographing operation and a storing operation of said image data and being operated more than once for setting said function, said direct key being used for setting said function and being operated only once for setting said function; and a controller that sets said function corresponding to an operation of said operation key and that sets said function corresponding to one operation of said direct key;

when said direct key is operated once, said function being set regardless of a prior function state set by operating said operation key, wherein one of a first pattern and a second pattern is selected by operating said operation key;

in said first pattern, a state of said photographing apparatus after said function is set by said direct key is released so that said state of said photographing apparatus is returned to a prior state of before operating said direct key when said direct key is operated again before said photographing operation is next performed, when said photographing operation is performed once, or when an electrical power of said photographing apparatus is set to an OFF state and then said electrical power is set to an ON state again; and in said second pattern, said state of said photographing apparatus after said function is set by said direct key is released so that said state of said photographing apparatus is returned to said prior state when said direct key is operated again, when said electrical power is set to said OFF state and then said electrical power is set to said ON state again.]

[2. The photographing apparatus according to claim 1, wherein said function is regarding a file format of said image data for said storing operation.]

[3. The photographing apparatus according to claim 1, wherein said function is regarding a file format of said image data for said storing operation; and said function is set so that said image data is stored in both RAW file format and a compressed file format, or only in RAW file format, by operating said direct key.]

[4. The photographing apparatus according to claim 1, further comprising a display that displays at least one of a first state of said photographing apparatus before operating said direct key and a second state of said photographing apparatus after operating said direct key.]

[5. The photographing apparatus according to claim 1, wherein said direct key is arranged on a front of said photographing apparatus and on a right-hand side surface of a lens-mounting section used for installing a lens, when viewed from a front.]

[6. The photographing apparatus according to claim 1, wherein a content of said function that is set by operating said direct key is changeable by operating said operation key.]

*7. A photographing apparatus comprising:*

*an operation unit that has a direct key and an operation member, the operation member being operated with more than one action for setting a file format so that image data obtained by a photographing operation is stored in at least one of a RAW file format and a compressed file format and the direct key for setting a file format with a single operation of the direct key; and*

*a controller that sets the file format of the image data, in accordance with an operation of the operation member;*

*the controller setting the file format so that the image data is stored in both a RAW file format and a compressed file format, in accordance with the single operation of the direct key;*

*when a single shooting mode is set, the controller setting the file format so that the image data is stored in both the RAW file format and the compressed file format when a release button is depressed once, and then resetting the file format to one that was in effect before the direct key was operated, and when a continuous shooting mode is set, the controller setting the file format so that the image data is stored in both the RAW file format and the compressed file format while the release button is continuously depressed, and then resetting the file format to one that was in effect before the direct key was operated.*

*8. The photographing apparatus according to claim 7, wherein the controller sets the file format so that the image data is stored in both the RAW file format and the compressed file format, in accordance with a single operation of the direct key, and when the direct key is again operated before the release button is depressed, the controller resets the file format to one that was in effect before the direct key was operated for the first time.*

*9. The photographing apparatus according to claim 7, wherein the controller sets the file format so that the image data is stored in both the RAW file format and the compressed file format, in accordance with a single operation of the direct key, and when the power source of the photographing apparatus is turned off and then turned on before the release button is depressed, the controller resets the file format to one that was in effect before the direct key was operated for the first time.*

*10. The photographing apparatus according to claim 7, further comprising a display unit that displays the state of the photographing apparatus after operation of the direct key, when the controller sets the file format so that the image data is stored in both the RAW file format and the compressed file format, the display unit displays the number of recordable images in both file formats based on the vacant capacity of a memory provided in the photographing apparatus.*

*11. The photographing apparatus according to claim 7, wherein the direct key is arranged on a front of the photographing apparatus and on a right-hand side surface of a lens-mounting section used for installing a lens, when viewed from the front of the photographing apparatus.*

*12. The photographing apparatus according to claim 7, wherein the file format of the image data set by operation of the direct key is changeable by operating the operation member.*

*13. A photographing apparatus comprising:*

*an operation unit that has a direct key and an operation member, the operation member being operated with more than one action for setting a file format so that image data obtained by a photographing operation is stored in at least one of a RAW file format and a compressed file format and the direct key for setting a file format with a single operation of the direct key; and*

*a controller that sets the file format of the image data, in accordance with an operation of the operation member;*

*the controller setting the file format so that the image data is stored in both the RAW file format and the compressed file format, in accordance with the single operation of the direct key;*

*the controller setting the file format so that the image data is stored in both the RAW file format and the compressed file format when a release button is depressed once, and then resetting the file format to one that was in effect before the direct key was operated.*

*14. The photographing apparatus according to claim 13, wherein the operation member is operated when setting at least one of the number of recorded pixels stored to a memory provided in the photographing apparatus, and a compression ratio for storing the image data to the memory.*

*15. The photographing apparatus according to claim 13, wherein the operation member is operated when setting at least one of a shutter speed and an aperture value.*

*16. A photographing apparatus comprising:*

*an operation unit that has a direct key and an operation member, the operation member being operated with more than one action for setting a file format so that image data obtained by a photographing operation is stored in at least one of a first file format and a second*

*file format and the direct key for setting a file format with a single operation of the direct key; and*

*a controller that sets the file format of the image data, in accordance with an operation of the operation member;*

*the controller setting the file format so that the image data is stored in both the first file format and the second file format, in accordance with the single operation of the direct key;*

*the controller setting the file format so that the image data is stored in both the first file format and the second file format when a release button is depressed once, and then resetting the file format to one that was in effect before the direct key was operated.*

*17. The photographing apparatus according to claim 16, wherein the first file format and the second file format are different from each other at least in a file format or in a number of pixels.*

*18. The photographing apparatus according to claim 16, wherein at least one of the first file format and the second file format contains a file format and a number of recorded pixels, which are in conformity with the specification of a mobile terminal.*

* * * * *